(12) United States Patent
Whitmore et al.

(10) Patent No.: US 10,774,789 B2
(45) Date of Patent: Sep. 15, 2020

(54) METHODS AND SYSTEMS FOR RESTARTABLE, HYBRID-ROCKETS

(71) Applicants: Stephen Whitmore, Logan, UT (US); Anthony Marc Bulcher, Logan, UT (US); Zachary Lewis, Logan, UT (US); Nathan Inkley, Hewitt, TX (US)

(72) Inventors: Stephen Whitmore, Logan, UT (US); Anthony Marc Bulcher, Logan, UT (US); Zachary Lewis, Logan, UT (US); Nathan Inkley, Hewitt, TX (US)

(73) Assignee: Utah State University, Logan, UT (US)

( * ) Notice: Subject to any disclaimer, the term of this patent is extended or adjusted under 35 U.S.C. 154(b) by 169 days.

(21) Appl. No.: 16/362,430

(22) Filed: Mar. 22, 2019

(65) Prior Publication Data

US 2020/0025151 A1    Jan. 23, 2020

Related U.S. Application Data

(63) Continuation-in-part of application No. 14/802,537, filed on Jul. 17, 2015, now Pat. No. 10,527,004, (Continued)

(51) Int. Cl.
*F02K 9/94* (2006.01)
*F02K 9/72* (2006.01)
(Continued)

(52) U.S. Cl.
CPC ............... *F02K 9/72* (2013.01); *C06B 31/02* (2013.01); *C06B 33/00* (2013.01); *C06B 45/10* (2013.01);
(Continued)

(58) Field of Classification Search
CPC ..... F02K 9/08; F02K 9/18; F02K 9/26; F02K 9/72; F02K 9/94; F02K 9/95; C06B 31/02;
(Continued)

(56) References Cited

U.S. PATENT DOCUMENTS 4,795,938 A    1/1989   Meredith
5,715,675 A    2/1998   Smith
(Continued)

FOREIGN PATENT DOCUMENTS

EP    2524727 A1    5/2011
NL    1533511 A1    11/2003

OTHER PUBLICATIONS

Whitmore et al., "Enhanced performance of an enriched air/ABS hybrid rocket using oxidizing fuel additives". 54th AIAA/SAE/ASEE Joint Propulsion Conference. Jul. 9, 2018. Cincinnati, Ohio.
(Continued)

*Primary Examiner* — Mark A Laurenzi
*Assistant Examiner* — Loren C Edwards

(57) ABSTRACT

Embodiments of the present invention are directed to various devices, systems and methods of providing a restartable, hybrid-rocket system that uses Acrylonitrile Butadiene Styrene (ABS) and compressed air containing oxygen levels up to 40% as a propellant. Alternatively, embodiments of the present invention includes restartable hybrid rocket system that uses a heterogeneous matrix of ABS and a solid oxidizing agent in addition to compressed air as a propellant. When the ABS is exposed to an electrical potential field, the electrical field's effect on the ABS produces localized arcing between multiple layers of the ABS resulting in joule heating and pyrolysis of the ABS. The pyrolysis produces spontaneous combustion of the ABS once the oxidizer flow
(Continued)

provides a local oxygen partial pressure greater than two atmospheres at the surface of the ABS.

20 Claims, 5 Drawing Sheets

Related U.S. Application Data which is a continuation-in-part of application No. 13/953,877, filed on Jul. 30, 2013, now abandoned.

(60) Provisional application No. 62/647,401, filed on Mar. 23, 2018, provisional application No. 61/677,254, filed on Jul. 30, 2012, provisional application No. 61/677,266, filed on Jul. 30, 2012, provisional application No. 61/677,418, filed on Jul. 30, 2012, provisional application No. 61/677,426, filed on Jul. 30, 2012, provisional application No. 61/677,298, filed on Jul. 30, 2012, provisional application No. 62/026,420, filed on Jul. 18, 2014.

(51) Int. Cl.
　　*F02K 9/95*　　　(2006.01)
　　*C06B 33/00*　　 (2006.01)
　　*C06B 31/02*　　 (2006.01)
　　*C06B 45/10*　　 (2006.01)
　　*B33Y 10/00*　　 (2015.01)
　　*B33Y 80/00*　　 (2015.01)

(52) U.S. Cl.
　　CPC .................. *F02K 9/94* (2013.01); *F02K 9/95* (2013.01); *B33Y 10/00* (2014.12); *B33Y 80/00* (2014.12)

(58) Field of Classification Search
　　CPC ......... C06B 33/00; C06B 45/10; B33Y 10/00; B33Y 80/00
　　See application file for complete search history.

(56) References Cited

U.S. PATENT DOCUMENTS

| | | | |
|---|---|---|---|
| 5,892,319 | A | 4/1999 | Rossi |
| 6,058,697 | A | 5/2000 | Smith |
| 6,393,830 | B1 | 5/2002 | Hamke |
| 6,779,335 | B2 | 8/2004 | Herdy |
| 7,716,912 | B2 | 5/2010 | Cover |
| 8,015,920 | B1 | 9/2011 | Wilkinson |
| 8,225,507 | B2 | 7/2012 | Fuller |
| 8,327,617 | B2 | 12/2012 | Gustofsson |
| 8,539,753 | B2 | 9/2013 | Macklin |
| 2002/0121081 | A1 | 9/2002 | Cesaroni |
| 2003/0136111 | A1 | 7/2003 | Kline |
| 2004/0068979 | A1 | 4/2004 | Kline |
| 2009/0217525 | A1 | 9/2009 | Fuller |
| 2009/0217642 | A1 | 9/2009 | Fuller |
| 2012/0060468 | A1 | 3/2012 | Dushku |
| 2012/0285016 | A1 | 7/2012 | Fuller |
| 2013/0031888 | A1 | 2/2013 | Fuller |
| 2013/0042596 | A1 | 2/2013 | Fuller |
| 2014/0026537 | A1 | 1/2014 | Eilers |
| 2015/0322892 | A1 | 11/2015 | Whitmore |
| 2016/0356245 | A1 | 12/2016 | Danforth |
| 2017/0073280 | A1 | 3/2017 | Jones |
| 2017/0234268 | A1 | 8/2017 | Summers |

OTHER PUBLICATIONS

Whitmore et al., "A green hybrid thruster user moderately enriched compressed air as the oxidizer." 54th AIAA/SAE/ASEE Joint Propulsion Conference. Jul. 9, 2018. Cincinnati, Ohio.

Wilson et al., Catalytic decomposition of nitrous oxide monopropellant for hybrid motor re-ignition, 47th AIAA/ASME/SAE/ASEE Joint Propulsion Conference & Exhibit, Jul. 31, 2011.

Eilers et al., Devleopment and testing of the regeneratively cooled multiple use plug hybrid (for) nanosats (MUPHyN) motor, 48th AIAA/ASME/SAE/ASEE Joint Propulsion Conference & Exhibit, Jul. 29, 2012.

McCulley, et al., Design and testing of fdm manufactured paraffin-abs hybrid rocket motors, 48th AIAA/ASME/SAE/ASEE Joint Propulsion Conference & Exhibit, Jul. 29, 2012.

Peterson, et al., Closed-loop thrust and pressure profile throttling of a nitrous-oxide htpb hybrid rocket motor, 48th AIAA/ASME/SAE/ASEE Joint Propulsion Conference & Exhibit, Jul. 29, 2012.

Whitmore, et al., Analytical and experimental comparisons of htpb and abs as hybrid rocket fuels, 47th AIAA/ASME/SAE/ASEE Joint Propulsion Conference & Exhibit, Jul. 31, 2011.

Goldstein, The Greening of Satellite Propulsion, Aerospace America, Feb. 2012.

Safie, F. M., and Fox, E.P., A Probabilistic Design Analysis Approach for Launch Systems, AIAA-1991-1186, 27th AIAA, SAE, ASME, and ASEE, Joint Propulsion Conference, Sacramento, CA, USA; Jun. 24-26, 1991.

Chang, Investigation of Space Launch Vehicle Catastrophic Failures, Journal of Spacecraft and Rockets, vol. 33, No. 2, Mar.-Apr. 1996.

Maggio, G., Space Shuttle Probabilistic Risk Assessment: Methodology and Application, International Symposium on Product Quality and Integrity, Proceedings of the Reliability and Maintainability Symposium, Las Vegas, NV, USA, Jan. 22-25, 1996.

Gibbon et al., Investigation of an Alternative Geometry Hybrid Rocket for Small Spacecraft Orbit Transfer, Tech. rep., Surrey Satellite Technology LTD, Jul. 27, 2001.

Knuth et al., Solid-Fuel Regression Rate Behavior of Vortex Hybrid Rocket Engines, The Journal of Propulsion and Power, vol. 18, No. 3, pp. 600-609, May-Jun. 2002.

Lemieux, P., Nitrous Oxide Cooling in Hybrid Rocket Nozzles, Progress in Aerospace Sciences, vol. 46, pp. 106-115, Dec. 29, 2009.

Lemieux, P., Development of Reusable Aerospike Nozzle for Hybrid Rocket Motors, 39th AIAA Fluid Dynamics conference, Jun. 22, 2009.

Grieb, J., Design and Analysis of a Reusable N20-Cooled Aerospike Nozzle for Labscale Hybrid rocket Motor Testing, Master's Thesis presented to the Faculty of California Polytechnic State University, Feb. 2012.

Mayer, E., Analysis of Convective Heat Transfer in Rocket Nozzles, ARS Journal, pp. 911-916, 1961.

Gordon et al., "Computer Program for Calculation of Complex Chemical Equilibrium Compositions and Applications I. Analysis," Tech. rep., NASA RP-1311, 1994.

McBride et al., Computer Program for Calculation of Complex Chemical Equilibrium Compositions and Applications II, Users Manual and Program Description, Tech. rep., NASA RP-1311, Oct. 1994.

Span et al., "Equations of State for Technical Applications. I. Simultaneously Optimized Functional Forms for Nonpolar and Polar Fluids," International Journal of Thermophysics, vol. 24, No. 1, pp. 1-39, Jan. 1, 2003.

Span et al., "Equations of State for Technical Applications. II. Results for Nonpolar Fluids," International Journal of Thermophysics, vol. 24, No. 1, pp. 41-109, Jan. 1, 2003.

Span et al., "Equations of State for Technical Applications. III. Results for Polar Fluids," International Journal of Thermophysics, vol. 24, No. 1, pp. 111-162, Jan. 1, 2003.

Dyer et al., Modeling Feed System Flow Physics for Self Pressurizing Propellants, 43rd AIAA/ASME/SAE/ASEE Joint Propulsion Conference & Exhibit, Jul. 8, 2007.

Whitmore, et al., Development of a Power Efficient, Restart-Capable Arc Ignitor for Hybrid Rockets, 50th AIAA/ASME/SAE/ASEE Joint Propulsion Conference and Exhibit, Jul. 28, 2014, AIAA-2014-3949, American Institute of Aeronautics and Astronautics, Cleveland OH.

(56) References Cited

OTHER PUBLICATIONS

Whitmore et al., Electrostatic Igniter for an Additively Manufactured Acrylonitrite-Butadiene-Styrene-Nitrous-Oxide Hybrid Rocket Motor, Journal of Propulsion and Power, Apr. 28, 2015, pp. 1217-1220, vol. 31, No. 4.
USPTO, Non-Final Office Action for U.S. Appl. No. 13/953,877 for "Multiple Use Hybrid Rocket Motor" filed Jul. 30, 2013, Office Action dated Jan. 20, 2016.
Eilers et al., Analytical and Experimental Evaluation of Aerodynamic Thrust vectoring on an Aerospike Nozzle, 46th AIAA/ASME/ASEE Joint Propulsion Conference & Exhibit, Jul. 25, 2010, Nashville, TN.
Approctech, Pyro Free Ignition of Hybrid Rocket Motor with Wax/Epoxy Resin Grain, YouTube.com, Nov. 9, 2010.
USPTO, Final Office Action for U.S. Appl. No. 14/802,537 for "Restartable Ignition Devices, Systems, and Methods Thereof" filed Jul. 17, 2015, Office Action dated Aug. 31, 2018.
USPTO, Non-final Office Action for U.S. Appl. No. 14/802,537 for "Restartable Ignition Devices, Systems, and Methods Thereof" filed Jul. 17, 2015, Office Action dated May 23, 2019.

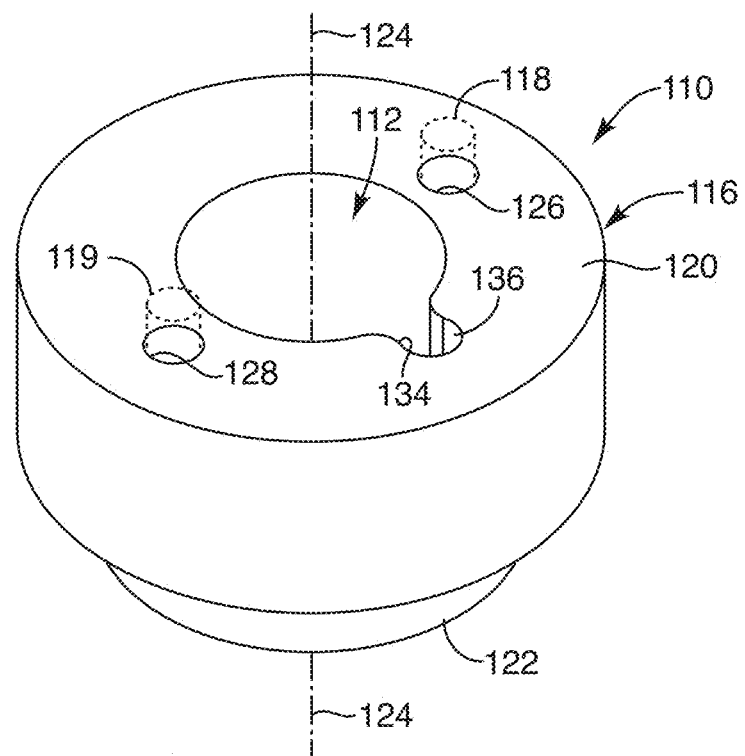
FIG. 7
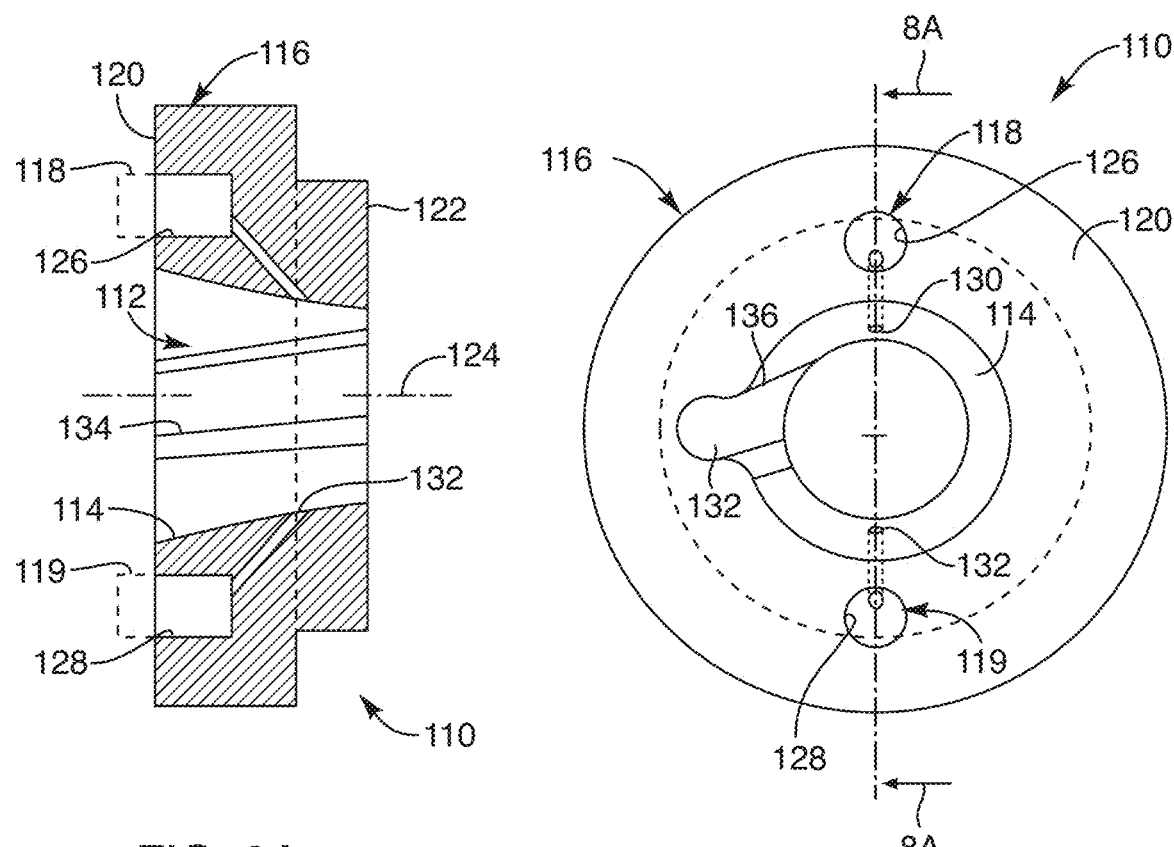
FIG. 8A
FIG. 8

METHODS AND SYSTEMS FOR RESTARTABLE, HYBRID-ROCKETS

CROSS-REFERENCE TO RELATED APPLICATIONS

This application is a continuation-in-part application to U.S. Non-provisional application Ser. No. 14/802,537, filed on Jul. 17, 2015 and entitled "Restartable Ignition Devices, Systems, and Methods Thereof," which is hereby incorporated by reference in its entirety. This application also claims priority to U.S. Provisional Application No. 62/647,401, filed on Mar. 23, 2018, entitled "Methods and Systems for Green Rockets Using a Compressed-Air Oxidizer," which is herein incorporated by this reference in its entirety.

Application Ser. No. 14/802,537 is a continuation-in-part application to U.S. Non-provisional application Ser. No. 13/953,877, filed on Jul. 30, 2013, entitled "Multiple Use Hybrid Rocket Motor," which is hereby incorporated by reference in its entirety. Application Ser. No. 14/802,537 also claims the benefit under 35 U.S.C. § 119(e) of U.S. Provisional Application Nos. 61/677,254; 61/677,266; 61/677,418; 61/677,426; and 61/677,298; all filed Jul. 30, 2012, all of which are hereby incorporated by reference in their entirety. Application Ser. No. 14/802,537 also claims priority to U.S. Provisional Application No. 62/026,420, filed on Jul. 18, 2014, entitled "Restartable Ignition Devices, Systems, and Methods Thereof," which is herein incorporated by this reference in its entirety.

GOVERNMENT SPONSORED RESEARCH

This invention was made with government support under contract NNX12AN12G awarded by NASA. The government has certain rights in the invention.

TECHNICAL FIELD

The present invention relates generally to 3-D printed, Acrylonitrile Butadiene Styrene (ABS), hybrid rocket systems.

BACKGROUND

The current state of the art for hybrid rocket ignition systems is largely based on pyrotechnic ignition methods. These methods have serious shortcomings including the inability to initiate multiple re-starts using a single device, thus, limiting the applicability of the hybrid rocket. Other shortcomings include significant physical and environmental hazards. For example, making rockets safer, less toxic, and less explosive comes at a significant cost. As the propellant materials become less volatile, they also become increasingly difficult to ignite. Combustion of hybrid propellants must be initiated by an igniter that provides sufficient heat to cause pyrolysis of the solid fuel grain at the head end of the motor, while simultaneously providing sufficient residual energy to overcome the activation energy of the propellants to initiate combustion. Thus, hybrid rockets have typically used large, high output pyrotechnic charges to initiate combustion. Such igniters are capable of producing very high-enthalpy outputs, but are extremely susceptible to hazards of electromagnetic radiation and present significant operational hazards. Most importantly, such pyrotechnic igniters are designed as "one-shot" devices that do not allow multiple re-start capability.

BRIEF SUMMARY OF THE INVENTION

The inventor of the present disclosure has identified the need for a "green" hybrid thruster using 3-D printed Acrylonitrile Butadiene Styrene (ABS) as a propellant. Safety concerns with using high-pressure oxygen on a ride sharing payload have led to successful development of a hybrid system that replaces pure oxygen with oxygen-enriched, compressed air (Nitrox). In addition, due to the relatively low specific gravity of GOX, propulsion applications demand storage pressures up to 3000 psig. At these high pressures, GOX presents a fire hazard that is not generally accepted by the rideshare community. As a fire-risk mitigation, GOX can be replaced with compressed air containing oxygen levels up to 40%. At 3000 psi the resulting O2 partial pressures for these mixtures varies from 630 to 1200 psig; levels well below upper limits allowed for nearly all industrial, commercial aviation, and medical applications. The present disclosure in aspects and embodiments addresses these various needs and problems.

However, a major downside of the ABS/nitrox system is the relatively large volume required to store the high-pressure nitrox, which can significantly lower the system's volumetric specific impulse, $I_r$. To combat this deficiency, oxidizing additives can be added to the ABS fuel grain itself. By the nature of additive manufacturing, the entire fuel grain can be printed with a prescribed in-fill density, leaving small voids throughout the entire fuel grain. These voids which can be filled with an oxidizing agent, create a heterogeneous matrix with some benefits similar to solid propellants but retain their ability to start, extinguish, and re-start ignition. The present disclosure in aspects and embodiments also addresses these various needs and problems.

Embodiments of the present invention are directed to various devices, systems and methods of providing a restartable, hybrid-rocket system that uses Acrylonitrile Butadiene Styrene (ABS) and compressed air containing oxygen levels up to 40% as a propellant. Alternatively, embodiments of the present invention includes restartable hybrid rocket system that uses a heterogeneous matrix of ABS and a solid oxidizing agent in addition to compressed air as a propellant.

In embodiments, a restartable, hybrid-rocket system, comprises a container configured to deliver an oxidizer flow containing an oxygen-enriched compressed-air mixture having an oxygen concentration greater than 32% molar (by volume). The system may further comprise a housing formed through fused deposition modeling of multiple layers of ABS. The housing may have a proximal and a distal end, the housing defining a bore extending therethrough between the proximal and distal ends, the bore defined by an internal surface of the ABS within the housing, and the bore configured to pass the oxidizer flow therethrough. In addition, at least two electrodes may extend through the housing to the internal surface of the ABS. The at least two electrodes are configured to provide an electrical potential field along the internal surface of the ABS between the at least two electrodes. When the internal surface of the ABS is exposed to the electrical potential field from the at least two electrodes, the electrical field's effect on the ABS produces localized arcing between the multiple layers of the ABS resulting in joule heating and pyrolysis of the internal surface of the ABS. The pyrolysis of the internal surface is configured to produce spontaneous combustion of the internal surface of the ABS once the oxidizer flow provides a local oxygen partial pressure greater than two atmospheres within the bore at the internal surface of the ABS.

In embodiments, a restartable hybrid rocket system may further be configured to completely cease combustion of the internal surface of the ABS once the oxidizer flow is stopped. The system may thereafter re-initiate spontaneous combustion of the internal surface of the ABS when the internal surface of the ABS is again exposed to the electrical potential field and the oxidizer flow again provides a local oxygen partial pressure of two atmospheres within the bore at the internal surface of the ABS. This process may be repeatable multiple times as the inventors of the present disclosure have demonstrated in the lab.

In other embodiments, the oxygen-enriched compressed-air mixture has an oxygen concentration between 32 and 40% molar (by volume). Still in other embodiments, nitrous oxide ($N_2O$) or 90% hydrogen peroxide ($H_2O_2$) may be used in place of the oxygen-enriched compressed-air mixture.

The restartable, hybrid-rocket system disclosed herein requires very little energy to ignite and re-ignite through multiple restarts. In embodiments, the localized arcing between the multiple layers of the ABS resulting in joule heating and pyrolysis of the internal surface of the ABS requires less than 3 joules of energy.

In other embodiments, the housing formed through fused deposition modeling of multiple layers of ABS comprises a heterogeneous matrix containing between 15 and 50% of oxidizing additive. The oxidizing additive may be potassium permanganate ($KMnO_4$) or potassium nitrate (KNOB).

Methods for firing a restartable, hybrid-rocket system are also disclosed herein. In embodiments, a method for firing a restartable, hybrid-rocket system comprises providing a container configured to deliver an oxidizer flow containing an oxygen-enriched compressed-air mixture having an oxygen concentration greater than 32% molar (by volume). In addition, the method includes forming a housing through fused deposition modeling of multiple layers of Acrylonitrile Butadiene Styrene (ABS). The housing has a proximal and a distal end and defines a bore extending therethrough between the proximal and distal ends. The bore is defined by an internal surface of the ABS within the housing and the bore is configured to pass the oxidizer flow therethrough. The method also includes providing at least two electrodes extending through the housing to the internal surface of the ABS. The at least two electrodes are configured to provide an electrical potential field along the internal surface of the ABS between the at least two electrodes.

Firing the restartable, hybrid-rocket system includes exposing the internal surface of the ABS to the electrical potential field from the at least two electrodes, thus producing localized arcing between the multiple layers of the ABS resulting in joule heating and pyrolysis of the internal surface of the ABS. Finally, firing includes delivering the oxidizer flow sufficient to reach a local oxygen partial pressure greater than two atmospheres within the bore at the internal surface of the ABS. A method of re-firing the restartable, hybrid-rocket system includes stopping the oxidizer flow to the internal surface of the ABS sufficient to completely cease combustion of the internal surface of the ABS. Thereafter, refiring includes re-exposing the internal surface of the ABS to the electrical potential field and restarting the oxidizer flow sufficient to produce a local oxygen partial pressure greater than two atmospheres within the bore at the internal surface of the ABS. This process may be repeated multiple times until either the ABS fuel or the oxidizer flow is exhausted through combustion.

BRIEF DESCRIPTION OF THE SEVERAL VIEWS OF THE DRAWINGS

The foregoing and other advantages of the invention will become apparent upon reading the following detailed description and upon reference to the drawings in which:

FIG. 7 is a perspective view of another embodiment of an igniter system, according to the present invention;

FIG. 8 is a top view of the igniter system of FIG. 7, according to another embodiment of the present invention;

FIG. 8A is a cross-sectional view of the igniter system taken along section 8A of FIG. 8, according to another embodiment of the present invention.

DETAILED DESCRIPTION OF THE INVENTION

Figure 1:
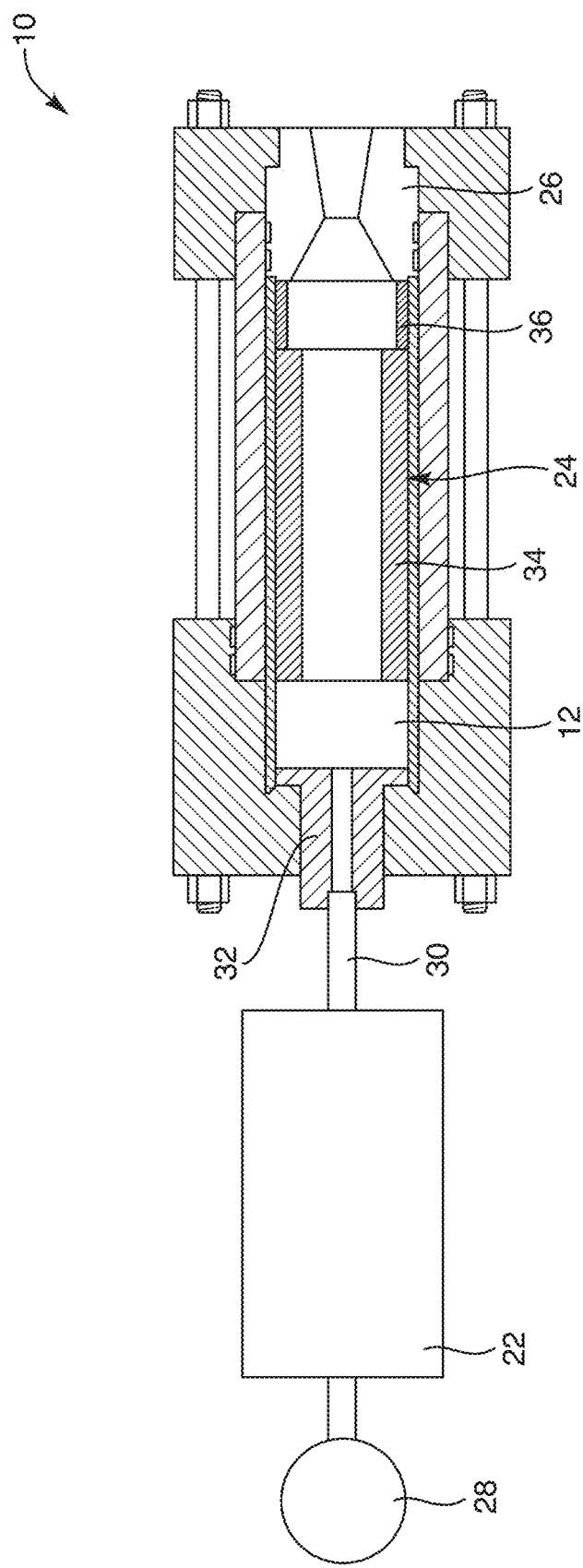
FIG. 1 is a simplified side view of a hybrid rocket system, according to one embodiment of the present invention.
Figure 2:
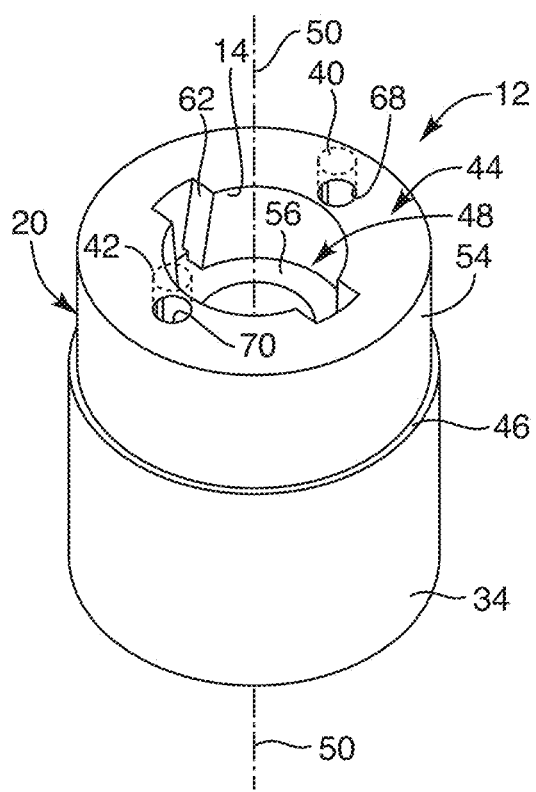
FIG. 2 is a perspective view of an igniter system of a hybrid rocket system, according to another embodiment of the present invention.
Figure 6:
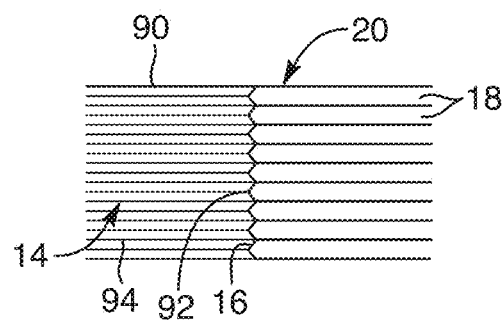
FIG. 6 is an enlarged view of detail 6 in FIG. 5, depicting ridges and grooves of the multiple layers defined in the igniter portion, according to another embodiment of the present invention.

Referring to FIGS. 1 and 2, a simplified view of a hybrid rocket system 10 or motor that includes an ignition system 12 or pre-combustion portion, according to the present invention, is provided. Referring to FIGS. 3A, 3B, and 6, in one embodiment, the ignition system 12 or pre-combustion portion may include a housing 20 formed of multiple flat layers 18 by employing fused deposition modeling (FDM) or three-dimensional printing. Such FDM process provides an internal surface 14 with ridges 16 formed from the multiple flat layers 18 deposited upon each other (See FIG. 6). The ignition system 12 may also include electrodes 86 and 88 spaced from each other and positioned adjacent the internal surface 14. Upon a propellant or oxidizer being injected into the system and activating an electrical potential field between the electrodes 86 and 88, the ridges 16 along the internal surface 14 may concentrate an electrical charge which seeds combustion of the solid grain fuel material.

As will be described herein, the unique structural characteristics of the material and structure of the internal surface 14 and housing 20 provide an ignition system 12 that is re-startable. For example, multiple re-starts have been implemented with the ignition system 12 set forth herein. The inventors have found that the only limitation to the number of allowable restarts is the quantity of solid fuel grain material contained within the ignition system 12 and the amount of oxidizer that may be injected into the system. Such ignition system 12 may require small input energy and may use only non-toxic and non-explosive propellants with the simplicity and reliability of a monopropellant system, but with the output enthalpy equivalent to a bi-propellant igniter. As such, the re-startable ignition system 12 may have applicability to military aircraft, missile systems for post-stall maneuvering, emergency gas generation cycles, and many other applications relating to systems that may benefit from the re-startable ignition system.

With reference to FIG. 1, the basic components of the hybrid rocket system 10 may include a gaseous or liquid fuel container 22 or tank, a combustion portion 24, and a nozzle 26. The gaseous fuel or propellant may be nitrous oxide or gaseous oxygen or any other suitable gaseous or liquid propellant. The gaseous fuel container 22 may be disposed between a gas pressurization element 28 and a gas feed system 30. The gas feed system 30 may feed an injector portion 32, which in turn controllably injects propellant into the combustion portion 24 of the hybrid rocket system 10. The combustion portion 24 of the system may include multiple portions, such as, the ignition system 12 or pre-combustion portion, a main combustion portion 34, and a post combustion portion 36. The main combustion portion 34 may be formed of one or more solid grain fuels, such as acrylic or hydroxyl-terminated polybutadiene (HTPB), or any other suitable solid grain propellant known in the art. In one embodiment, the solid grain propellant for the main combustion portion 34 and post combustion portion 36 may be acrylonitrile butadiene styrene (ABS) or combinations of other known solid propellants. The combustion portion 24 and, more particularly, the post combustion portion 36 may be coupled to the nozzle 26 or other similar structure. The nozzle 26 may include various nozzle configurations, depending upon the application of a particular rocket system or the like. With this arrangement, the ignition system 12 of the present invention may be employed with the other components of the hybrid rocket system 10 to facilitate multiple re-starts with one device, i.e., without replacing parts.

In FDM processing, a plastic filament is unwound from a coil that supplies material to an extrusion nozzle. The nozzle is heated to melt the feed-stock, and its position is computer numerically controlled (CNC) in three dimensions using a robotic mechanism. Because FDM manufacturing builds the specimen one layer at a time, each printed layer is microscopically thin at the surface. When exposed to an electrostatic potential field, the layered structure concentrates minute positive and negative electrical charges. The charge asymmetry produces localized arcing between material layers, and the dissipated energy results in a material glass-transition from crystalline to amorphous.

The amorphous layer is highly conductive, allowing the electrical arcs to cause a surface char-layer with the result being a surface "arc-track." Joule heating along this surface arc-track allows sufficient fuel material pyrolysis so that combustion occurs spontaneously once a local oxygen partial pressure of approximately two atmospheres is reached. The high oxygen concentration is provided by an external oxidizer flow.

Figure 3:
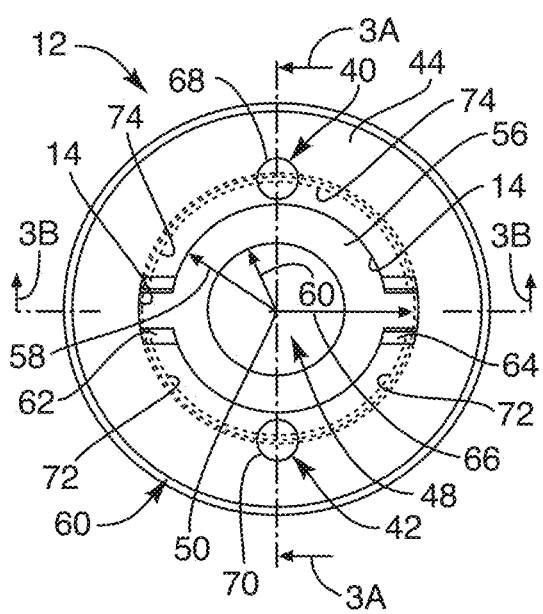
FIG. 3 is top view of the igniter system of FIG. 2, according to another embodiment of the present invention.
Figure 3A:
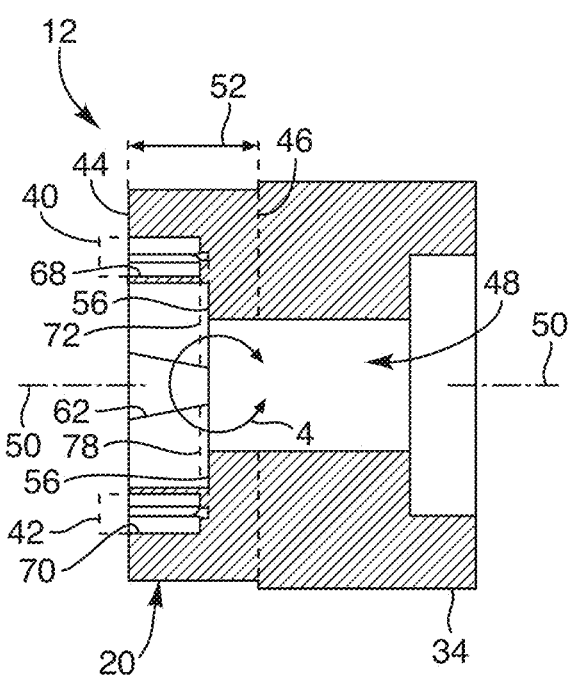
FIG. 3A is a cross-sectional view of the igniter system taken along section 3A of FIG. 3, according to another embodiment of the present invention.
Figure 3B:
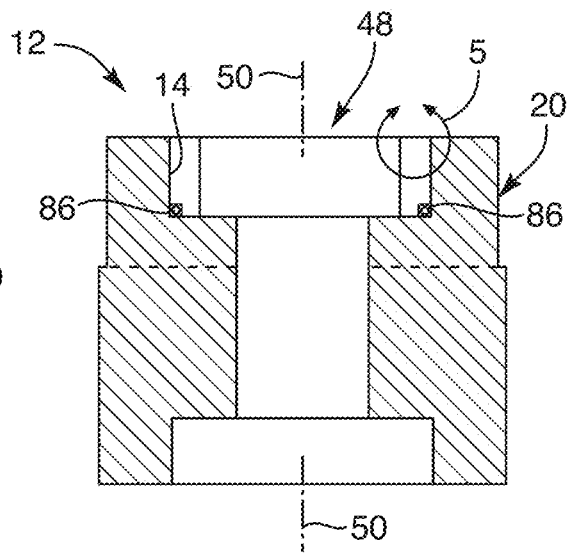
FIG. 3B is a cross-sectional view of the igniter system taken along section 3B of FIG. 3, according to another embodiment of the present invention.

Now with reference to FIGS. 2, 3 and 3A, various views of an ignition system 12 or pre-combustion portion are provided. As set forth, the ignition system 12 or pre-combustion portion may be directly coupled to the main combustion portion 34. The ignition system 12, as depicted in the illustrated example, is directly coupled to a shortened minimal portion of the main combustion portion 34. More important to this description is that the ignition system 12 or pre-combustion portion may include the housing 20 and first and second electrode components 40, 42.

In one embodiment, the housing 20 may include a sleeve like structure with various ports and notches therein and further, the sleeve like structure may include the internal surface 14 with a step configuration. For example, the housing 20 may include a first side 44 and a second side 46 with a bore 48 extending through and between the first and second sides 44, 46 of the housing 20. The second side 46 is illustrated as an interface surface between the housing 20 and main combustion portion 34. The bore 48 may define a centrally extending axis 50 along a length 52 of the housing 20. Further, the housing 20 may include an external surface 54 and the before mentioned internal surface 14. The external surface 54 may include cylindrical shape or any another suitable structure.

The internal surface 14 may define the bore 48 of the housing 20, the bore 48 defining a radial component such that a cross-section of the bore 48 may be defined as generally circular or any other suitable structure. Further, as set forth, the internal surface 14 may define a step configuration so as to include a shelf 56. In this manner, the bore 48 may include a first radius 58 and a second radius 60, the first radius 58 and the second radius 60 extending laterally from the axis 50 to the internal surface 14 of the housing 20. Such first radius 58 may extend along the length of the bore 48 from the first side 44 of the housing 20 to the shelf 56. The second radius 60 may extend along the length from the shelf 56 to the second side 46 of the housing 20. With this arrangement, the first radius 58 may be larger than the second radius 60 such that the bore 48 exhibits a larger opening on the first side 44 of the housing 20 than on the second side 46 of the housing 20.

With respect to FIGS. 2, 3, 3A, and 4, as set forth, the housing 20 may include various ports and/or notches therein. For example, in one embodiment, the bore 48 of the housing 20 may also include a first notch 62 and a second notch 64, each defined by the internal surface 14. The first and the second notches 62, 64 may be positioned on opposite sides of the bore 48 so as to face each other. Each of the first and second notches 62, 64 may extend between the shelf 56 and the first side 44 of the housing 20 such that the shelf 56 extends further at the notch to define a third radius 66 or a third dimension, the third radius 66 or dimension being larger than the first radius 58 and being defined from the axis 50 to the internal surface 14 at the first and second notches 62, 64. At least one of the first and second notches 62, 64 may be sized and configured to exhibit electrodes 86, 88 at, for example, base corners of the at least one of the first and second notches 62, 64 and adjacent the shelf 56, discussed in further detail herein.

Further, the housing 20 may include one or more ports for the electrode components. For example, the housing 20 may include a first port 68 and a second port 70. The first and second ports 68, 70 may be positioned opposite each other on the first side 44 of the housing 20. The first port 68 may define a first port cavity 72 (shown in outline form) extending from the first port 68 to a first port outlet 74. The first port outlet 74 may be disposed at a first base corner 76 of the first notch 62 on the shelf 56 and adjacent to the internal surface 14 having the third radius 66. Similarly, the second port 70 may extend with a second port cavity 78 to a second port outlet 80 at a second base corner 82 of the first notch 62 on the shelf 56. In this manner, the first port outlet 74 and the second port outlet 80 of the first notch 62 may be disposed at opposite first and second base corners 76, 82 of the first notch 62. A similar arrangement may be employed for the second notch 64 defining first and second outlets of port cavities extending to the first and second ports. In this manner, the ports and cavities extending to the first notch and/or the second notch may be sized and configured for positioning electrodes 86, 88 of the first and second electrode components 40, 42. In another embodiment, one or both of the notches, 62 or 64, or other port may include a pressure sensor configured to measure the pressure of the propellant at the shelf 56.

Figure 4:
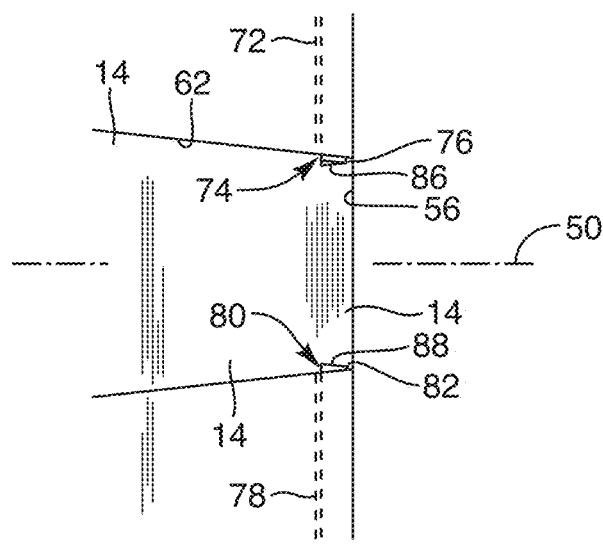
FIG. 4 is an enlarged view of detail 4 in FIG. 3A, depicting electrodes adjacent an internal surface, according to another embodiment of the present invention.

With respect to FIGS. 3A and 4, as set forth, the ignition system 12 or pre-combustion portion includes first and second electrode components 40, 42. The first and second electrode components 40, 42 may each include at least a conductive electrical wire that serves as an electrode at the end of the wire. Such electrode components may be embedded and positioned within the first and second ports 68, 70 so that respective first and second electrodes 86, 88 are exposed within the bore 48 and, more particularly at the first and second port outlets 74, 80 defined in, for example, the first notch 62. Within the bore 48, the first and second electrodes 86, 88 may be spaced a distance from each other so that, upon being electrically activated, the first and second electrodes 86, 88 provide a voltage potential or an electrical field potential adjacent the internal surface 14 between the first and second electrodes 86, 88. As depicted, such distance or spacing between the first and second electrodes 86, 88 may be defined by the first and second base corners 76, 82 in, for example, the first notch 62 in the bore 48. Further, the first and second electrodes 86, 88 may be exposed at and flush with the internal surface 14 of the bore 48. In another embodiment, the first and second electrodes 86, 88 may protrude from the internal surface 14 of the bore 48. Similar to that set forth above, another set of first and second electrodes 86, 88 may be positioned and spaced at the second notch 64.

As set forth, the housing 20 and bore 48 of this embodiment may include a step configuration to define the shelf 56. The shelf 56 may be sized and configured to act as an impingement to the oxidizer or an impingement shelf to slow the oxidizer from moving down stream so as to increase the pressure of the oxidizer at the shelf 56. The increase in pressure of the oxidizer at the shelf 56 may provide sufficient oxidizer for a combustion reaction of a solid grain fuel material on the internal surface 14. Suitable oxidizers may include gaseous oxygen, liquid oxygen, nitrous oxide, hydrogen peroxide, hydroxylammonium nitrate, ammonium dinitramide, or air. The oxidizer pressure increase at the impingement shelf 56 may enable the first and second electrodes 86, 88 to be minimally spaced (or minimally charged) to provide a charge concentration or voltage potential on the internal surface 14 of the bore 48 between the first and second electrodes 86, 88.

Figure 5:
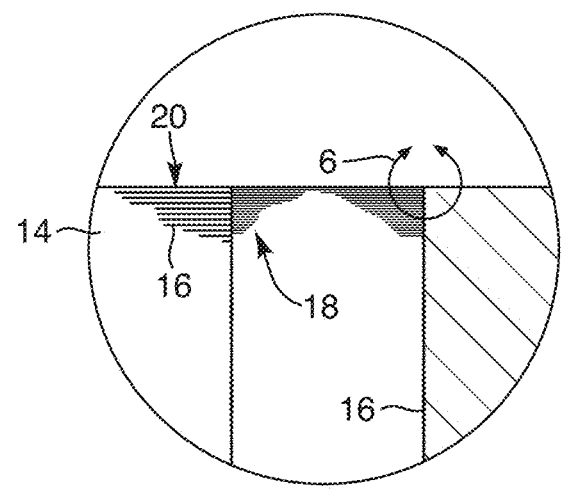
FIG. 5 is an enlarged view of detail 5 in FIG. 3B, depicting multiple layers defined in the igniter system, according to another embodiment of the present invention.

With respect to FIGS. 3B, 5, and 6, the housing 20 of the ignition system 12 may be formed from a solid grain fuel material. In one embodiment, the solid grain fuel material may be high or low density Acrylonitrile Butadiene Styrene (ABS) or any other suitable grain fuel material that holds similar electro-mechanical, combustion, and structural properties. As set forth, the housing 20 may be formed with multiple flat layers 18 deposited upon each other, employing the Fused Deposition Modeling (FDM) method or three-dimensional printing or any other suitable process for layering a fuel grain. Upon employing the FDM method, ABS possesses a very unique electro-mechanical property such that additive manufacturing results in a distinctive surface structure that is different than the surface of a monolithically fabricated (e.g., a molded or machined) ABS structure. In particular, this surface structure, such as the internal surface 14 defining the bore 48, is the surface structure that is transverse to a plane defined by any one of the multiple flat layers 18. Such surface structure or internal surface 14 has the effect of concentrating electrical charges locally when the surface 14 of the ABS material is subjected to an electrical potential field. These high-charge concentrations produce localized electrical arcing such that the ABS material breaks down at voltages significantly lower than that of a monolithically fabricated ABS structure. Described another way, the voltage potential created between the first and second electrodes 86, 88, when electrically activated, causes the unique features (the ridges 16 formed in the multiple flat layers 18 shown in FIG. 6) of the surface 14 to act as micro-electrodes which ignites the solid grain fuel material in the presence of an oxidizer.

In one embodiment, the multiple flat layers 18 may be deposited so that any one of the flat layers 18 define a plane that is transverse or perpendicular with the axis 50 of the housing 20. In another embodiment, the first and second electrodes 86, 88 (see FIG. 4) may define a line therebetween that may be generally parallel with a plane defined by each of the multiple flat layers 18. In still another embodiment, each of the flat layers 18 may define a plane that is substantially parallel with the axis 50 of the housing 20. In any one of these embodiments, the multiple flat layers 18, deposited upon each other, form the internal surface 14 with ridges 16 or ridged layering. The ridges 16 or ridged layering may be defined by peripheral ends 90 of the multiple flat layers 18. As set forth, the unique mechanical structure (e.g., the surface characteristics created by the FMD layering) of the ridges 16 and multiple flat layers 18, in conjunction of the material being a solid grain fuel, such as ABS material, act as multiple micro-electrodes when subjected to an electrical potential field. Such unique mechanical structure facilitates the ignition system 12 to implement multiple re-starts. For example, even as material from the internal surface 14 is initially consumed or removed through combustion, a newly exposed internal surface 14 maintains similar surface characteristics or surface roughness that act as micro-electrodes when exposed to an electrical potential field.

With respect to FIG. 6, an enlarged view of the multiple flat layers 18 and ridges of the fuel grain material are depicted. As set forth, the internal surface 14 defines ridges or ridged layering formed between each of the multiple flat layers 18. Each of the flat layers 18 may include a peak 92 with a small radius at its peripheral end such that the structure may also include a slope extending to the peak that may be substantially linear or radial. Although depicted as uniform ridges 16, such ridges may not be uniform along the internal surface 14 of the housing 20. In this manner, the internal surface 14 may exhibit a rough, coarse or scratched surface. The ridges may exhibit a nodal configuration or exhibit a protruding structure that may continue or discontinue along the peripheral end 90 of each of the multiple flat layers 18. Likewise, the internal surface 14 may exhibit grooves 94 formed between each of the multiple flat layers 18. In other words, each groove 94 extends between adjacently extending ridges 16. With this arrangement, the FDM technique of forming the housing, preferably with ABS material, provides for a unique electro-mechanical structure such that the flat layers 18 that exhibit the ridges 16 and/or grooves 94 therein reacts to an electrical potential field. In this manner, the structure and material itself act as multiple micro-electrodes, thereby, facilitating electrical breakdown to facilitate a restartable ignition for a hybrid rocket system.

With respect to FIGS. 7, 8, and 8A, another embodiment of an ignition system 110 for a hybrid rocket system 10 (FIG. 1) is provided. This embodiment is similar to the previous embodiment, except this embodiment exhibits a bore 112, defined by an internal surface 114, with a convergent or conical configuration. For example, the ignition system 110 may include a housing 116 and first and second electrode components 118, 119. The housing 116 may include a first side 120 and a second side 122 with the bore 112 extending through and between the first and second sides 120, 122. The bore 112 may define a centrally located axis 124 extending along the length of the housing 116. The housing 116 may include first and second electrode ports 126, 128 that may extend from the first side 120 to a convergent portion of the bore 112 so that a first and second electrode 130, 132 may be exposed within the bore 112. The housing 116 may also include a pressure port 134 with a corresponding pressure sensor 136 so that a pressure within the bore 112 may be determined upon receiving the propellant. Similar to that described and depicted in FIG. 6 of the previous embodiment, the housing 116 of this embodiment may be formed with multiple flat layers 18 that exhibit a roughened surface or ridges 16 that provide the before-discussed unique structural characteristic along the internal surface 114 of the conical bore 112. In this manner, upon the first and second electrodes 130, 132 being activated to provide an electrical potential field, the multiple flat layers 18 deposited upon each other and exhibiting the ridges 16 and/or grooves 94 react and concentrate a charge, thereby, acting as multiple micro-electrodes at the internal surface 114 of the bore 112.

As set forth in this embodiment, the bore 112 in the housing 116 is convergent. The bore 112 may be sized and configured to converge so as to increase the pressure of the oxidizer as it moves downstream through the bore 112. The increase in pressure of the oxidizer as it moves downstream through the bore 112 may provide sufficient oxidizer for a combustion reaction of a solid grain fuel material on the internal surface 114. Suitable oxidizers may include gaseous oxygen, liquid oxygen, nitrous oxide, hydrogen peroxide, hydroxylammonium nitrate, ammonium dinitramide, or air. The oxidizer pressure increase at the narrower portion of the bore 112 may enable the first and second electrodes 130, 132 to be minimally spaced (or minimally charged) to provide a charge concentration or voltage potential on the internal surface 114 of the convergent portion of the bore 112 between the first and second electrodes 130, 132.

Similar to previous embodiments, the multiple flat layers 18, deposited upon each other, form the internal surface 114 with ridges 16 or ridged layering. The unique mechanical structure (e.g., the surface characteristics created by the FMD layering) of the ridges 16 and multiple flat layers 18, in conjunction of the material being a solid grain fuel, such as ABS material, act as multiple micro-electrodes on the internal surface 114 when subjected to an electrical potential field. Such unique mechanical structure facilitates the ignition system 116 to implement multiple re-starts. For example, even as material from the internal surface 114 is initially consumed or removed through combustion, a newly exposed internal surface 114 maintains similar surface characteristics or surface roughness that act as micro-electrodes when exposed to an electrical potential field from charged electrodes 130, 132.

Through the course of several research programs conducted by the inventors of the present disclosure, the physical properties of ABS layers within the restartable, hybrid rocket systemm has been developed into a simple, low wattage, on demand hybrid ignition system with a moderately-high Technology Readiness Level (TRL). Motivated by this enabling discovery, the inventors recently began testing very small-scale, low massflow hybrid rockets for space propulsion applications. These inherently safe, "green" propulsion technologies are being targeted as potential low-cost "drop in" replacements for many hydrazine-based systems.

Direct on demand ignition has been demonstrated using ABS and gaseous oxygen (GOX) for multiple motor configurations with thrust levels varying from less than 5 N to greater than 900 N. Multiple scales of hybrid rocket fuels have been successfully designed, fabricated, integrated, and test fired using this additive manufacturing and arc-ignition technology. Each of the motors uses identical technologies with the only tangible differences being the scale of the motor mold lines.

For example, reliable, on-demand ignition on a flight weight 38-mm diameter, 25 N thruster system has also been demonstrated during both ambient and vacuum operation using GOX and ABS as propellants. Ambient tests of the 38 mm small-scale motor, produced specific impulse (Isp) values of 210 seconds with a 2.1:1 nozzle expansion ratio. The same motor when tested in a soft vacuum environment—approximately 0.15 atmospheres—with an optimized 10:1 expansion ratio nozzle produced an average Isp of 280 seconds. When this performance is extrapolated to hard vacuum conditions, the projected Isp exceeds 300 seconds!

As a fire-risk mitigation measure, the inventors of the present disclosure investigated the feasibility of replacing GOX with compressed air containing oxygen levels up to 40% molar (by volume) concentration. Enriched air mixtures referred to as "Nitrox" are widely available for use by fire prevention, rescue, and law enforcement services; and prepackaged, certified, mixtures with oxygen concentration of 32% (EAN32) to 36% (EAN36) can be procured at most commercial scuba shops. Nitrox is the gas commonly used in scuba diving to decrease the risk of decompression sickness.

The inventors have identified that Nitrox, as a hybrid rocket oxidizer, is safer than GOX because of its reluctance to combust due to its high nitrogen content. At 3000 psi storage pressure, the resulting $O_2$ partial pressures for the commercial EAN32 and EAN36 mixtures varies from 960 to 1080 psig. When appropriate material compatibility rules are followed, these $O_2$ partial pressure levels are well below safety limits allowed for nearly all industrial, commercial aviation, and medical applications.

When compressed air is used the restartable, hybrid-hybrid rocket system offers the single flow path simplicity and safety of a traditional cold-gas system, but with a factor of performance increase of up to 340% (EAN36). Promisingly, switching from pure GOX to EAN 36 compressed air mixture, only drops the expected c* performance by less than 17%. The presented data was calculated using the industry standard NASA chemical equilibrium code, CEA.

A major downside of the ABS/nitrox system is the relatively large volume required to store the high-pressure nitrox, significantly lowering the system's volumetric specific impulse, $I_v$. To combat this deficiency, oxidizing additives can be added to the fuel grain itself. The 3-d printed fuel grains are ideal for this application. By the nature of additive manufacturing, the entire fuel grain can be printed with a prescribed in-fill density, leaving small voids throughout the entire fuel grain. These voids which can be filled with an oxidizing agent, creating a heterogeneous matrix with properties similar to those solid propellants.

Figure 9:
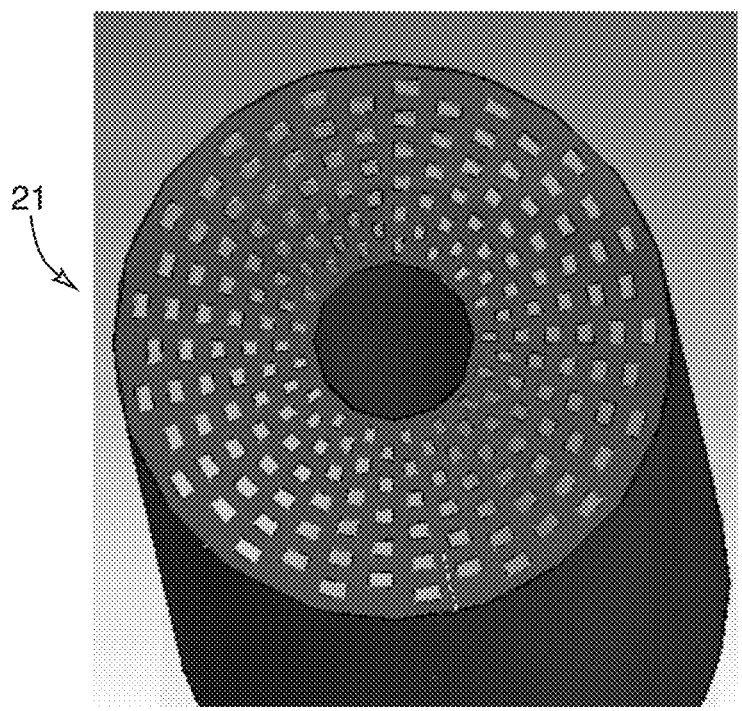
FIG. 9 shows a prototype heterogeneous configuration where the fuel grain has been printed with a 50% in-fill density with an oxidizing additive.

FIG. 9 shows a prototype heterogeneous configuration where the fuel grain has been printed with a 50% in-fill density, and the remaining voids have been filled with dissolved material.

A key design task is to select appropriate materials that will not allow the fuel to spontaneously burn at normal oxygen concentrations. Care must be taken not to simply create a solid propellant mix, thereby eliminating a key safety consideration of hybrid propellants. Thus, for this application the oxidizing salts potassium permanganate ($KMnO_4$) and potassium nitrate ($KNO_3$) were selected. Both of these compounds have low enthalpies of formation, leading to a very high propellant stability and likely preserving the ability to stop and restart the hybrid motor. In addition to using the oxidizing salts described above, the inventors of the present disclosure found that while testing the prototype heterogeneous configuration, a 15% in-fill density of oxidizing additives prevented the hybrid motor from smoldering, e.g., continuing to burn, when the oxidizer flow was stopped. This concentration of oxidizing additives to ABS allowed a prototype restartable, hybrid-rocket system to completely extinguish before being re-ignited.

The choice of oxidizing agents was also based on the chemical's solubility in water. Both $KMnO_4$ and $KNO_3$ readily dissolve in water, leading to a very easy method of manufacture. The initial ABS fuel grain is built on a standard 3-D printer, set to an in-fill density of 70-80%, leaving small voids throughout the entire plastic structure. The grain is then soaked in a high concentration aqueous solution of $KMnO_4$ or $KNO_3$, heated/vacuum dried to evaporate all water in the grain, leaving a relatively constant additive distribution throughout the voids in the ABS grain.

Initial performance evaluations for motors based on nitrox, ABS, and $KMnO_4$ or KNOB were performed using the chemical equilibrium and application (CEA) program published by NASA. The inventors compared the C* for the ABS/EAN36 propellant, ABS/KMnO4/EAN36 propellant, and ABS/KNO3/EAN36 propellant. Two main changes are of note. First is the small performance drop, indicated by C*. ABS/EAN36 propellant has a peak C* of 1500 m/s, while ABS/KMnO4/EAN36 and ABS/KNO3/EAN36 peak just over 1450 m/s. This result implies a similar drop in $I_{sp}$, of approximately 3-4%, which is almost insignificant. Second is the oxygen-to-fuel (O/F) ratio of the peak C*. In the ABS/EAN36 motor, the peak C* is at an O/F ratio of 6, a by mass ratio of nitrox to ABS. For the ABS/KMnO4/EAN36 and ABS/KNO3/EAN36 propellants, the peak C* shifts to an O/F slightly greater than 4. This additional result indicates a decrease in nitrox volume of just over 30%, a very significant saving.

EXPERIMENTAL EXAMPLES

In order to demonstrate the feasibility of replacing GOX with compressed air, series of ground tests were performed using the test apparatus and flight-weight hardware described herein. The goal of this test series was to evaluate the system performance with varying concentrations of oxygen in the oxidizer feed flow, and to establish minimum oxygen concentrations required for a successful ignition. All ground tests were performed under ambient pressure conditions in the Propulsion Research Laboratory at Utah State University.

The printed fuel grains that were fabricated using a Stratasys Dimension 1200-ES® fused deposition model (FDM) printer. The inventors investigated multiple commercially available 3-D printer feedstocks, and determined that ABSplus-340® feed-stock exhibited the best overall arc-ignition and burn performance characteristics. Conservatively, to ensure adequate performance and operating characteristics for this testing campaign, all fuel grains were printed using Stratasys ABSplus-340® feed-stock.

Test stand measurements included venturi-based oxidizer massflow measurements, load-cell based thrust measurements, chamber pressure, and multiple temperature readings at various points along the flow path. The differential venturi pressure transducer was installed to increase the accuracy of the sensed pressure drops. The thrust-stand support members allow bending along the direction of thrust to prevent them from interfering with the measured load. The entire test assembly was made using commercially available T-slot extruded-aluminum components.

The ignition system power processing unit (PPU) is based on the UltraVolt® D-series line of highvoltage power supplies (HVPS). This HVPS provides the inductive ignition spark that pyrolyzes sufficient ABS material to seed combustion. The D-series HVPS units require a 15-volt DC input to provide a 7.5 mA current-limited high voltage output up to 1000 V or 6 Watts total output. Previous experience with this ignition system has demonstrated that ignition can be reliably achieved using as little as 3 watts. Depending on the impedance on the arc path between the ignitor electrodes, the dissipated voltage can vary from 10 to 400 volts. Total energy of ignition is typically less than 3 joules.

The HVPS provides low voltage output diagnostic signals that are proportional to the output current and high-voltage for tracking the unit operation. The high voltage output is initiated by a commanded TTL-level input signal through the NI USB 6002. Two separate commands are required to initiate the ignition sequence. For this test series, the firing sequence that ensured reliable ignition sends the spark TTL command 250 ms-500 ms before the GOX-valve open command. The spark potential then continued for 250 ms to 500 ms after the GOX-valve has opened.

Directly aft of the thrust chamber lies the solenoid actuated GOX run-valve. The solenoid flow valve is actuated via a digital out command from the instrumentation. The National Instruments (NI) USB-6002 sends digital signals to the solenoid valve via the solid-state relay and HVPS using LabView as the controller. The 24V power supply is used to supply power to the solenoid valve and HVPS; whereas, the 15V power supply is used to power the transducers. The thermocouples, venturi inlet, differential, and chamber pressure transducers, along with the load cell have their signals conditioned using National Instruments Data Acquisition (DAQ) units.

In the experiments, the successful ignition and sustained combustion of ABS fuel with compressed air relies on two features: 1) oxidizer flow rate large enough to choke the nozzle throat so as to ensure a rapid increase in chamber pressure and 2) oxidizer feed pressure greater than any expected operating chamber pressure to ensure a choked injector. The simplest method to ensure a choked nozzle during startup and steady operation was to machine the injector diameter to match the nozzle throat diameter.

In this test series, in order to establish a baseline, the motor was first burned using 100% GOX at various chamber pressures, and then the GOX was replaced with compressed air with increasingly levels of enrichment from 21% to EAN32, EAN36, and 40%. Chamber pressure was adjusted as required in increments of approximately 25 from 25 to 150 psia.

From this test series the inventors discovered that reliable arc ignition could be achieved once the partial pressure of $O_2$ in the thrust chamber exceeded approximately two atmospheres.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the spirit and scope of the invention as defined by the following appended claims.

We claim:

1. A restartable, hybrid-rocket system, comprising:
    a container configured to deliver an oxidizer flow containing an oxygen-enriched compressed-air mixture having an oxygen concentration greater than 32% molar (by volume);
    a housing formed through fused deposition modeling of multiple layers of Acrylonitrile Butadiene Styrene (ABS); the housing having a proximal and a distal end, the housing defining a bore extending therethrough between the proximal and distal ends, the bore defined by an internal surface of the ABS within the housing, and the bore configured to pass the oxidizer flow therethrough; and
    at least two electrodes extending through the housing to the internal surface of the ABS, the at least two electrodes configured to provide an electrical potential field along the internal surface of the ABS between the at least two electrodes;
    wherein:
    the internal surface of the ABS, when exposed to the electrical potential field from the at least two electrodes, is configured to produce localized arcing between the multiple layers of the ABS resulting in joule heating and pyrolysis of the internal surface of the ABS; and
    the pyrolysis of the internal surface is configured to produce spontaneous combustion of the internal surface of the ABS once the oxidizer flow provides a local oxygen partial pressure greater than two atmospheres within the bore at the internal surface of the ABS.

2. The restartable, hybrid-rocket system of claim 1, wherein the restartable, hybrid-rocket system is configured to completely cease combustion of the internal surface of the ABS once the oxidizer flow is stopped and thereafter re-initiate spontaneous combustion of the internal surface of the ABS when the internal surface of the ABS is again exposed to the electrical potential field from the at least two electrodes and the oxidizer flow again provides a local oxygen partial pressure of two atmospheres within the bore at the internal surface of the ABS.

3. The restartable, hybrid-rocket system of claim 2, wherein the restartable, hybrid-rocket system is configured to completely cease and thereafter re-initiate combustion of the internal surface of the ABS at least five times.

4. The restartable, hybrid-rocket system of claim 1, wherein the oxygen concentration is between 32 and 40% molar (by volume).

5. The restartable, hybrid-rocket system of claim 1, wherein the oxygen-enriched compressed-air mixture is instead nitrous oxide ($N_2O$).

6. The restartable, hybrid-rocket system of claim 1, wherein the oxygen-enriched compressed-air mixture is instead 90% hydrogen peroxide ($H_2O_2$).

7. The restartable, hybrid-rocket system of claim 1, wherein the localized arcing between the multiple layers of the ABS resulting in the joule heating and the pyrolysis of the internal surface of the ABS requires less than 3 joules of energy.

8. The restartable, hybrid-rocket system of claim 1, wherein the housing formed through fused deposition modeling of multiple layers of ABS comprises a heterogeneous matrix containing between 15 and 50% of oxidizing additive.

9. The restartable, hybrid-rocket system of claim 8, wherein the oxidizing additive is potassium permanganate ($KMnO_4$).

10. The restartable, hybrid-rocket system of claim 8, wherein the oxidizing additive is potassium nitrate ($KNO_3$).

11. The restartable, hybrid-rocket system of claim 1, wherein the housing formed through fused deposition modeling of multiple layers of ABS comprises a heterogeneous matrix containing up to 15% of oxidizing additives.

12. A method of firing a restartable, hybrid-rocket system, comprising:
    providing a container configured to deliver an oxidizer flow containing an oxygen-enriched compressed-air mixture having an oxygen concentration greater than 32% molar (by volume);
    forming a housing through fused deposition modeling of multiple layers of Acrylonitrile Butadiene Styrene (ABS); the housing having a proximal and a distal end, the housing defining a bore extending therethrough between the proximal and distal ends, the bore defined by an internal surface of the ABS within the housing, and the bore configured to pass the oxidizer flow therethrough;
    providing at least two electrodes extending through the housing to the internal surface of the ABS, the at least two electrodes configured to provide an electrical potential field along the internal surface of the ABS between the at least two electrodes;
    exposing the internal surface of the ABS to the electrical potential field from the at least two electrodes, thus producing localized arcing between the multiple layers of the ABS resulting in joule heating and pyrolysis of the internal surface of the ABS; and
    configuring the pyrolysis of the internal surface of the ABS to produce spontaneous combustion of the internal surface of the ABS once the oxidizer flow provides a local oxygen partial pressure greater than two atmospheres within the bore at the internal surface of the ABS.

13. The method of ie-firing the restartable, hybrid-rocket system of claim 12, further comprising:
    stopping the oxidizer flow to the internal surface of the ABS sufficient to completely cease the combustion of the internal surface of the ABS;
    re-exposing the internal surface of the ABS to the electrical potential field;
    and restarting the oxidizer flow sufficient to produce the local oxygen partial pressure greater than two atmospheres within the bore at the internal surface of the ABS.

14. The method of firing the restartable, hybrid-rocket system of claim 13, comprising repeating in the same order at least five times the steps of:
    stopping the oxidizer flow to the internal surface of the ABS sufficient to completely cease the combustion of the internal surface of the ABS, re-exposing the internal surface of the ABS to the electrical potential field, and restarting the oxidizer flow sufficient to produce the local oxygen partial pressure greater than two atmospheres within the bore at the internal surface of the ABS.

15. The method of firing the restartable, hybrid-rocket system of claim 12, wherein the oxygen concentration is between 32 and 40% molar (by volume).

16. The method of firing the restartable, hybrid-rocket system of claim 12, wherein the oxygen-enriched compressed-air mixture is instead nitrous oxide ($N_2O$).

17. The method of firing the restartable, hybrid-rocket system of claim 12, wherein the oxygen-enriched compressed-air mixture is instead 90% hydrogen peroxide ($H_2O_2$).

18. The method of firing the restartable, hybrid-rocket system of claim 12, wherein the localized arcing between the multiple layers of the ABS resulting in the joule heating and the pyrolysis of the internal surface of the ABS requires less than 3 joules of energy.

19. The method of firing the restartable, hybrid-rocket system of claim 12, wherein forming the housing through fused deposition modeling of multiple layers of ABS further comprises forming within the housing a heterogeneous matrix containing between 15 and 50% of oxidizing additive.

20. The method of firing the restartable, hybrid-rocket system of claim 19, wherein the oxidizing additive is potassium permanganate ($KMnO_4$) or potassium nitrate ($KNO_3$).

* * * * *